(12) United States Patent
Larsson et al.

(10) Patent No.: US 7,703,080 B2
(45) Date of Patent: *Apr. 20, 2010

(54) INTERPRETER FOR EXECUTING COMPUTER PROGRAMS AND METHOD FOR COLLECTING STATISTICS

(75) Inventors: Fredrik Larsson, Solna (SE); Bengt Werner, Akersberga (SE); Peter Magnusson, Lidingo (SE)

(73) Assignee: Virtutech AB, Stockholm (SE)

( * ) Notice: Subject to any disclaimer, the term of this patent is extended or adjusted under 35 U.S.C. 154(b) by 1239 days.

This patent is subject to a terminal disclaimer.

(21) Appl. No.: 11/215,059

(22) Filed: Aug. 30, 2005

(65) Prior Publication Data

US 2006/0041876 A1 Feb. 23, 2006

Related U.S. Application Data

(63) Continuation of application No. 09/893,798, filed on Jun. 28, 2001, now Pat. No. 6,948,157.

(30) Foreign Application Priority Data

Jun. 28, 2000 (SE) .................................. 00022440

(51) Int. Cl.
*G06F 9/44* (2006.01)
*G06F 9/45* (2006.01)

(52) U.S. Cl. .................... 717/127; 717/126; 717/135
(58) Field of Classification Search ......... 717/134–140, 717/100–101, 126–130
See application file for complete search history.

(56) References Cited

U.S. PATENT DOCUMENTS

| | | | |
|---|---|---|---|
| 4,506,325 A | 3/1985 | Bennett et al. | |
| 4,905,138 A | 2/1990 | Bourne | |
| 5,212,794 A | 5/1993 | Pettis et al. | |
| 5,287,490 A | 2/1994 | Sites | |
| 5,317,740 A | 5/1994 | Sites | |
| 5,392,408 A | 2/1995 | Fitch | |
| 5,428,786 A | 6/1995 | Sites | |
| 5,469,574 A | 11/1995 | Chang et al. | |
| 5,613,117 A | 3/1997 | Davidson et al. | |
| 5,628,017 A * | 5/1997 | Kimmerly et al. | 717/127 |

(Continued)

FOREIGN PATENT DOCUMENTS

EP  0 943 990  9/1999

(Continued)

OTHER PUBLICATIONS

Ajaltouni et al, "An efficient dynamic load balancing scheme for distribted simulation on a grid infrastructure", IEEE, pp. 61-68, 2008.*

(Continued)

*Primary Examiner*—Anil Khatri
(74) *Attorney, Agent, or Firm*—Boyle Fredrickson, S.C.

(57) ABSTRACT

The invention relates to a computer program interpreter and a method for the same, using statistics to group (SR89, SR17 . . . SR6; SR4, SR34 . . . SR16) frequently used service routines (SR) in the same program function and to control encoding of instructions. Frequently used service routines are assigned shorter codes thus enhancing the performance of a simulator or emulator.

16 Claims, 1 Drawing Sheet

U.S. PATENT DOCUMENTS

| | | | |
|---|---|---|---|
| 5,680,620 A * | 10/1997 | Ross | 717/129 |
| 5,751,982 A | 5/1998 | Morley | |
| 5,794,005 A | 8/1998 | Steinman | |
| 5,796,623 A * | 8/1998 | Butts et al. | 703/23 |
| 5,796,989 A | 8/1998 | Morley et al. | |
| 5,802,373 A | 9/1998 | Yates et al. | |
| 5,809,450 A * | 9/1998 | Chrysos et al. | 702/186 |
| 5,920,720 A | 7/1999 | Toutonghi et al. | |
| 5,995,754 A | 11/1999 | Holzle et al. | |
| 6,009,273 A | 12/1999 | Ayers et al. | |
| 6,044,220 A | 3/2000 | Breternitz, Jr. | |
| 6,070,009 A * | 5/2000 | Dean et al. | 717/130 |
| 6,119,075 A * | 9/2000 | Dean et al. | 702/186 |
| 6,141,793 A | 10/2000 | Bryant et al. | |
| 6,148,396 A * | 11/2000 | Chrysos et al. | 712/227 |
| 6,192,516 B1 | 2/2001 | Griesemer | |
| 6,204,844 B1 * | 3/2001 | Fumarolo et al. | 715/736 |
| 6,208,387 B1 | 3/2001 | Magnusson | |
| 6,237,141 B1 | 5/2001 | Holzle et al. | |
| 6,243,668 B1 | 6/2001 | Le et al. | |
| 6,249,909 B1 * | 6/2001 | Russo et al. | 717/100 |
| 6,256,784 B1 | 7/2001 | Grove | |
| 6,263,495 B1 | 7/2001 | Kataoka | |
| 6,272,675 B1 * | 8/2001 | Schrab et al. | 717/100 |
| 6,292,936 B1 | 9/2001 | Wang | |
| 6,351,844 B1 | 2/2002 | Bala | |
| 6,412,107 B1 | 6/2002 | Cyran et al. | |
| 6,463,582 B1 | 10/2002 | Lethin et al. | |
| 6,470,492 B2 | 10/2002 | Bala et al. | |
| 6,549,930 B1 * | 4/2003 | Chrysos et al. | 718/104 |
| 6,578,193 B1 | 6/2003 | Adams | |
| 6,631,515 B1 | 10/2003 | Berstis | |
| 6,662,354 B1 | 12/2003 | Krablin et al. | |
| 6,704,923 B1 | 3/2004 | Gosling | |
| 6,745,320 B1 | 6/2004 | Mitsuishi | |
| 6,748,589 B1 | 6/2004 | Johnson et al. | |
| 6,760,903 B1 | 7/2004 | Morshed et al. | |
| 6,826,677 B2 | 11/2004 | Topham | |
| 6,842,894 B1 | 1/2005 | Havemose | |
| 6,910,207 B2 | 6/2005 | Steinbusch | |
| 6,938,246 B2 * | 8/2005 | Alford et al. | 717/128 |
| 6,941,545 B1 * | 9/2005 | Reese et al. | 717/130 |
| 6,948,157 B2 * | 9/2005 | Larsson et al. | 717/139 |
| 6,954,923 B1 * | 10/2005 | Yates et al. | 717/130 |
| 7,055,136 B2 * | 5/2006 | Dzoba et al. | 717/125 |
| 7,185,326 B2 * | 2/2007 | McIntosh et al. | 717/151 |

FOREIGN PATENT DOCUMENTS

| | | |
|---|---|---|
| WO | WO 01/97027 | 12/2001 |
| WO | WO 02/41143 | 5/2002 |

OTHER PUBLICATIONS

Tsai et al, "DDSOS: A dyanmic distributed service oriented simulation framework", IEEE ANSS, pp. 1-8, 2006.*

Uhlig et al, Trace driven memory simulation: A survey:, ACM vol. 29, No. 2, pp. 128-170, 1997.*

Park et al, "Aurora: An approach to high throughput parallel simulation", IEEE PADS, pp. 1-8, 2006.*

Radhakrishnan et al, "Improving Java Performance Using Hardware Translation", ACM ICS, pp. 427-439, 2001.

Skedzielewski et al, "DI: an Interactive Debugging Interpreter for Applicative Languages", ACM, pp. 102-112, 1987.

Singer, "Porting Legacy Interpretive Bytecode To The CLR", ACM PPPJ, pp. 163-168, 2002.

Magnusson, "Efficient Instruction Cache Simulation And Execution Profiling With A Threaded-Code Interpreter", ACM Proc. Winter Simulation Conference, pp. 1093-1100, 1997.

* cited by examiner

INTERPRETER FOR EXECUTING COMPUTER PROGRAMS AND METHOD FOR COLLECTING STATISTICS

CROSS REFERENCE TO RELATED APPLICATIONS

This application is a continuation of U.S. application Ser. No. 09/893,798, filed on Jun. 28, 2001, which issued Sep. 20, 2005 as U.S. Pat. No. 6,948,157, the entirety of which is hereby incorporated by reference, which claims priority to Swedish Patent Appl. No. 0002440-6, filed on Jun. 28, 2000.

TECHNICAL FIELD

The present invention relates in general to interpreters for executing computer programs realizing, for example, simulators or emulators. More specifically, the present invention relates an apparatus, a method and a computer program product realizing an interpreter providing statistic control encoding for frequency based clustering of service routines in computer program execution.

BACKGROUND

With the growing complexity of computer software and the growing reliance on software systems in everyday life and business, there is an increasing need for a high performance in the execution of the software. Performance of software, such as program simulators and emulators, is often crucial since these programs are meant to simulate a system or, like an emulator, to mimic the behavior of a specific system embedded in a larger program complex. The execution of software programs depends on the operation of compilers and interpreters that translates or interprets instruction sets to machine executable code. To achieve high performance of an interactive simulator in cases when instruction sets are not easily decoded, the best practice is to translate the instruction into an internal format, which in this text is called an intermediate format. The intermediate format code is faster to decode and execute for a software-implemented interpreter and can be used directly if the instruction is decoded and executed again.

To achieve high performance, prior art software interpreters usually limit parameter space to an instruction, for example by mapping an instruction to different service routines depending on the parameters given to the instruction. For example, the sparc instruction 'add' may be mapped to two different service routines, one that adds two registers and one that adds a register with a constant. Therefore, the number of service routines will typically be higher than the number of instructions in the simulated instruction set. When the number of service routines grow to a large number, certain compiler optimizations with a high time complexity will make compilation times unacceptable or will fail completely.

PRIOR ART

An example of prior art is found in U.S. Pat. No. 5,905,895, to Halter, showing a method for optimizing interpretation by carrying out a static analysis of the target or guest binary code. Pairs or sequences of byte code are replaced by an optimized byte code, thereby in effect optimizing predefined sequences of instructions.

U.S. Pat. No. 5,623,617, to Davidian, also optimizes predefined sequences of instructions by recognizing repeated sequences of the same instruction or commonly used groups of instructions.

Another piece of prior art is found in U.S. Pat. No. 5,889,996, to Adams, which describes a method to change the instruction cache policy in order to improve the performance of a virtual machine. In practice, this method may be hard to use since there is no access from a user level program to do such changes.

U.S. Pat. No. 6,044,220 describes a hardware support using a hash table to aid decoding target or guest instructions Other pertinent literature describing background art are, for example, Bell, J. R. 1973. "Threaded Code." Communications of the ACM 16, no. 6 (June): 370-372, and Bedichek, R. 1990. "Some Efficient Architecture Simulation Techniques." In USENIX—Winter '90, 53-63

Finally, the JP Abstract No JP 11296379 shows briefly how to optimize a memory arrangement.

OBJECT OF THE INVENTION

An object of the present invention is to solve the problem of achieving an improved interpreting method and interpreter for computer programs avoiding the drawbacks and problems of prior art interpreters.

An aspect of the problem to be solved is to decrease the overhead in certain service routine structures.

SUMMARY OF THE INVENTION

The present invention provides an optimization based on dynamically generated execution frequencies that optimize the fetch-decode-execute cycle for frequent individual instructions. Statistics is used to group frequently used service routines in the same program function and to control encoding of instructions. Frequently used service routines are assigned shorter codes thus enhancing the performance of a simulator or emulator and solving problems related to computer compiling speed.

The present invention is directed to an interpreter used to facilitate execution of program code that groups service routines into functions based on their frequency of execution using collected frequency of execution statistics. The interpreter preferably does so dynamically and can be implemented in hardware or software.

Program code, in the form of a computer program, includes instructions performed by the interpreter via corresponding service routines to perform the corresponding task or task defined thereby. The instructions are preferably first translated into an intermediate format comprising an intermediate code associated therewith.

The interpreter is configured to keep track of how often service routines are executed along with their parameters. The interpreter is configured to use the statistical frequency of service routine execution for the service routines to group frequently used service routines into a particular function using a predetermined frequency value. Where the interpreter has grouped service routines into two or more functions, jumps preferably are designated between each one of the functions. The interpreter preferably is also configured to keep track of how often service routines are executed after those of a particular function and preferably also is configured to assign more frequently executed service routines a shorter code than service routines executed after the aforementioned particular function. The gathered statistics from an execution are used by the interpreter to optimize service routines by grouping them and coding them in this manner resulting in faster execution speed.

Where the interpreter is configured to assign a shorter code to more frequently executed service routines, memory bandwidth usage is reduced when fetching intermediate code because the corresponding instruction is shorter. The interpreter can be configured to collect frequency of execution statistics before any simulator is compiled or can be configured to collect frequency of execution statistics and dynamically update a function by changing which service routines are grouped in it while the simulator is running.

Instruction sets written in a high level programming language can be used for a specific simulator task and translated into service routines capable of being statistically analyzed and assigned execution frequency based codes using the interpreter. The interpreter itself can be written in a high level programming language, such as standard ISO C.

The interpreter can be configured to share a program branch of a service routine in a particular function with all other service routines in that particular function. The interpreter can be configured to use a branch prediction table to reduce hard-to-predict jumps to reduce the number of jumps causing the table to function better on current processor architectures. The interpreter can also be configured to employ profile driven compilation to further enhance performance. The interpreter can be further configured to employ automatic compiler register mapping of often used variables by allocating them as local variables.

The interpreter can be configured so it does not use compiler specific extensions thereby providing compiler independence. If desired, the interpreter can be used by an emulator. The interpreter can also be configured to improve instruction cache performance by placing frequently used codes of service routines in the same function in a sequential block.

In a preferred method of interpreter operation, instructions of a computer program are preferably translated into an intermediate format that comprises an intermediate code such that service routines are used in carrying out program instructions. The interpreter collects and records statistics of how often the service routines are executed along with their parameters. Frequently used service routines are grouped into their own program function based on a predetermined frequency value. There preferably is a program jump designated between each program function to every other program function. There preferably also is a program jump or branch between each service routine to every other service routine within a particular program function. The interpreter preferably also keeps track of how frequently other service routines are executed after a particular program function. In an encoding step, the interpreter assigns more frequently executed service routines a shorter code. Shorter codes are preferably assigned to more frequently executed service routines than the codes assigned to service routines executed after a particular program function. The interpreter is able to do this after each execution to dynamically optimize frequently used service routines for faster execution speed.

An interpreter constructed in accordance with the invention can be implemented in the form of a computer program that is configured to perform an above described method in accordance with the invention using a data processor or a computer system.

Definitions

This section contains definitions and explanations of terms used in this text.

A code that runs on a host to perform the semantics of a simulated instruction is named a service routine.

A host is a computer the simulator is running on.

An intermediate format is defined as the way to structure and store intermediate code.

Intermediate code is instructions translated into a coding or internal code format that is easy for a software-based interpreter to interpret.

An interpreter is a hardware or software structure that performs operations specified in a program consisting of instructions.

BRIEF DESCRIPTION OF THE DRAWINGS

Henceforth reference is had to the attached figures for a better understanding of the present invention and its preferred embodiments, wherein.

DETAILED DESCRIPTION OF EMBODIMENTS

A central interpreter implemented in a high-level language e.g. "C" can be classified into one of three categories depending on its structure regarding service routines (SR), a code that performs the semantics of a simulated instruction. Either into one of the following categories all service routines in one function see FIG. 1, SR1, SR2, SR3 . . . SR100, only one service routine per function, see FIG. 2, SR1, SR2, SR3 . . . SR100, or the service routines are grouped into program functions with one or more service routines per function, see FIG. 3, according to prior art. A program function is marked up by a rectangle in attached FIG. 1 to FIG. 4. An instruction set is a set of operations and their encoding. The operation changes an internal state or performs an input or output. Examples of instruction sets are the Sparc v9 instruction set, which is typically interpreted by hardware, and the java virtual machine instruction set, which is typically interpreted by software.

Figure 3:
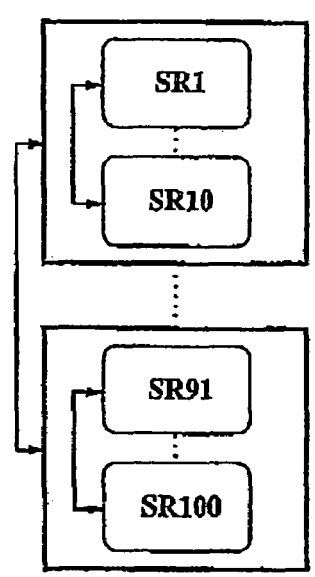
FIG. 3 schematically illustrates how service routines are grouped into functions with one or more service routines per function according to prior art.

In FIG. 3 the depicted two groups comprise service routines SR1 . . . SR10 and routine SR91 . . . SR100, respectively, other service routines SR11 . . . SR90 are not shown for reasons of simplicity. Each group makes up a program function.

Figure 1:
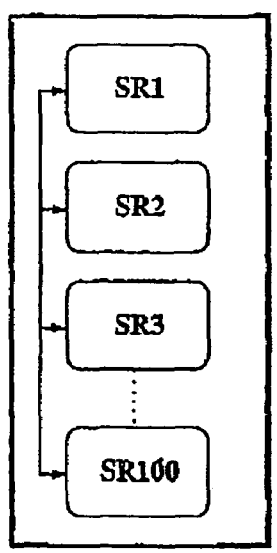
FIG. 1 schematically illustrates how all service routines are in one function according to prior art.

FIG. 1 schematically illustrates how all service routines are in one function according to prior art. The "all-SR" illustrated in FIG. 1 allows a compiler to accomplish various optimizations that affect several service routines, such as register allocation and code hoisting. Also, it comprises a low overhead when a software jump from one service routine to the next is accomplished. A serious problem is that when the number of service routines grows to a large number, certain compiler optimizations with a high time complexity will make compilation times unacceptable or will simply fail.

Figure 2:
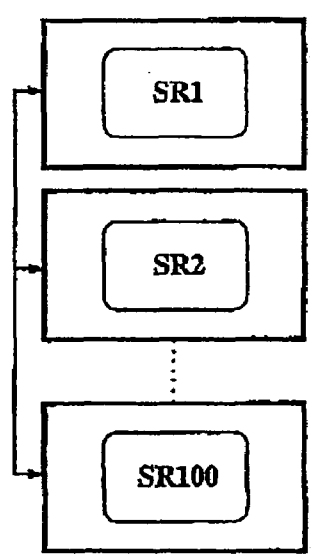
FIG. 2 schematically illustrates only one service routine per function according to prior art.

FIG. 2 schematically illustrates only one service routine per function according to prior art. The "single-SR" according to FIG. 2 does not allow any global optimization or automatic register allocation and will introduce a higher penalty for jumping from one service routine to the next when executing a software program.

FIG. 3 schematically illustrates how service routines are grouped into functions with one or more service routines per function according to prior art. The "group-SR" according to FIG. 3 is a compromise between two extremes such as single-SR and all-SR. When jumping between service routines in a function, it will have the same benefits as the all-SR but will suffer the overhead when jumping between functions.

The present invention introduces statistics to drastically reduce negative effects of the group-SR structure. Statistics are collected that show how often different service routines are executed and what parameters they had. Furthermore, the statistics also record the frequency of different service routines executed after a specific service routine.

Figure 4:
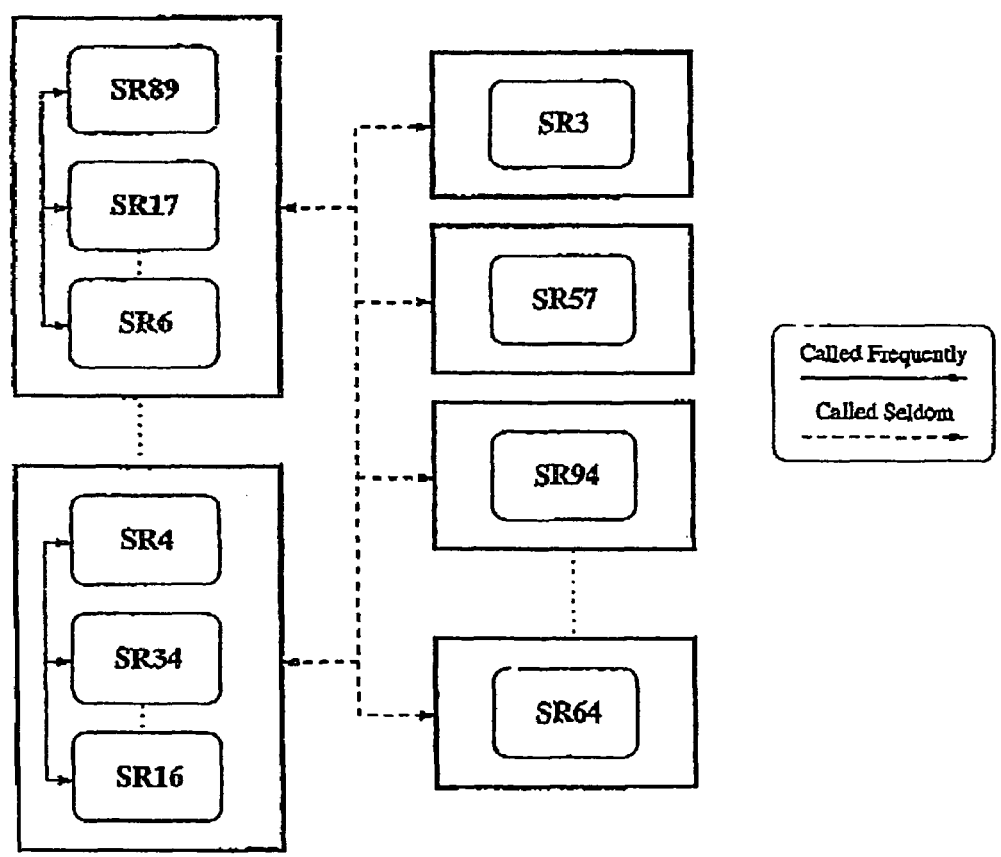
FIG. 4 schematically illustrates frequency clustering according to the present invention.

All the service routines that are executed frequently are grouped in one function, thus minimizing the jumps between functions. There may exist more than one such group, thus, it may result in more than one function. This is depicted in FIG. 4, which schematically illustrates frequency clustering according to the present invention with two groups in each function, the groups SR89, SR17 . . . SR6 and SR4, SR34 . . . SR16. This is the case if the statistics show that two or more groups of service routines are very common, but jumps between the groups are very infrequent. For example, the Intel x86 architecture has a 16 and a 32-bit mode in which the processor can operate.

A dotted arrow in FIG. 4 depicts seldom called service routines SR3, SR57, SR94 . . . SR64 and frequently called service routines SR89, SR17. . . SR6 and SR4, SR34 . . . SR16 are depicted with unbroken arrows.

Both modes may be common but 32 bit instructions and 16 bit instructions seldom follow each other.

The intermediate format is designed so that frequent service routines can be pointed out using a shorter code than the infrequent service routines. In effect the statistics gathered from execution will control the encoding to optimize common service routines for speed. The encoding will lead to reduced bandwidth to memory when fetching intermediate code, as the frequently executed instructions will be shorter.

Statistics used to group service routines can be collected before a simulator, an emulator that also reports about how the system is behaving internally, is compiled or while the simulator is running, in which case the simulator dynamically updates the set of service routines used to simulate the instruction set.

By providing the present invention, realistic instruction sets translated to service routines can be written in a high-level language, compiled and yield a portable effective simulator. For example it would allow writing an interpreter in ISO C and make it portable while still having excellent performance. It allows the interpreter to have a large number of service routines without a negative performance impact. Said interpreter comprises, in one embodiment of the present invention:

statistics means for collecting and recording statistics of how often service routines are executed and what parameters they had;

clustering means for grouping frequently used service routines with program jumps between each other in a program function with regard to a predetermined frequency value for determining such service routines;

said statistics means recording the frequency of service routines executed after a said function; and encoding means for assigning a frequently used service routines a shorter code than service routines SR3, SR57, SR94 . . . SR64 executed after a said function, thus gathered statistics, from an execution, control an encoding to optimize frequently used service routines for faster execution speed.

A number of optimizations will be possible to apply. Common code might be shared within the function containing the frequent service routines. For example, the service routine epilogue which, among other things, checks for asynchronous events and fetches the intermediate code for the next instruction is identical for all sequential instructions and may be shared. A branch to a next service routine may be shared by all service routines in the function. This reduces the number of software jumps that are hard to predict in branch prediction tables, causing them to comply better with current processor architectures. Profile driven compilation may be used to enhance the simulator performance even more.

The present invention provides that manual work such as doing explicit register mapping of often-used variables is avoided. Instead, they may be allocated as local variables thus letting the compiler do the register allocation. It will also avoid using compiler specific extensions, such as the GNU C && operator which takes the address of a label, making it more compiler independent.

A method used by an interpreter according to the present invention performs the steps of:

collecting and recording statistics of how often service routines are executed and what parameters they had;

grouping frequently used service routines with program jumps between each other in a program function with regard to a predetermined frequency value for determining such service routines;

said statistics recording the frequency of service routines executed after a said function; and encoding for assigning frequently used service routines a shorter code than service routines executed after a said function, thus gathered statistics, from an execution, control an encoding to optimize frequently used service routines for faster execution speed. Also, it is able to set forth embodiments of the interpreter above as described through attached dependent claims.

The present invention improves instruction cache performance by placing frequent code in a sequential block as it is placed in a common function.

It is appreciated that the present invention can be realized by means of hardware, software or a combination thereof.

The present invention has been described by way of exemplifying embodiments, and it should be appreciated by the person skilled in the art that the invention can be realized in a variety of ways within the spirit of the claims.

The invention claimed is:

1. A computer including a simulator operable to execute a set of simulator instructions simulated by a plurality of service routines, the computer being configured to execute computer-executable instructions stored on a computer-readable medium for performing the steps of:

executing a plurality of service routines;

monitoring a frequency of execution of each of the plurality of service routines;

generating a plurality of functions, each function including a plurality of the service routines selected based on the frequency of execution of each service routine; and modifying at least one service routine included in at least one generated function based on execution of the at least one service routine, to be included in a second generated function based on a change in the frequency of execution of the at least one service routine; wherein the step of monitoring the frequency of execution of each service routine includes collecting and recording statistics on the frequency of execution of each service routine; and updating the grouping of each of the service routines in each of the plurality of functions during execution of the service routine.

2. The computer of claim 1, further comprising computer-executable instructions for performing the steps of:

grouping a first plurality of service routines to generate a first function, grouping a second plurality of service routines to generate a second function different than the first function when the frequency of use of the second plurality of service routines is less than a predetermined frequency value, and assigning a service routine code to a first frequently used service routine in grouped in the first function, the service routine code being shorter relative to any other service routine assigned the second plurality of service routines grouped in the second function so that the first used service routine executes faster relative to each of the plurality of service routines grouped in the second function.

3. The computer of claim 2, further comprising computer-executable instructions for performing the steps of:

branching jumps from each service routine of the first plurality of the service routines grouped in the first function to every other service routine grouped in the first function;

branching jumps from each service routine of the second plurality of the service routines grouped in the second function to every other service routine grouped in the second function; and branching jumps from each of the plurality of functions to one or more of the other functions.

4. The computer of claim 3, further comprising computer-executable instructions for performing the additional step of:

reducing branching jumps using a prediction table.

5. The computer of claim 1, further comprising computer-executable instructions for performing the step of:

assigning a plurality of service routine codes, each service routine code being assigned to one of the plurality of functions, and each service routine code being different than the others, and arranging the service routine codes in a sequential block.

6. The computer of claim 1, wherein the computer executable instructions are performed before compiling the simulator.

7. The computer of claim 1, wherein the computer executable instructions are written in a high-level programming language.

8. A computer implemented method for improving performance of a plurality of service routines used to simulate a set of instructions of a computer program, the computer implemented method implemented by a set of computer-executable instructions stored on a computer readable medium for performing the steps of:

monitoring frequency of execution of each of the plurality of service routines during execution of the computer program;

generating a plurality of functions, each function including a plurality of the service routines selected based on the frequency of execution of each service routine; and modifying at least one service routine included in at least one function based on its frequency of service routine execution relative to the frequency of service routine execution of every other one of the service routines; wherein the step of monitoring the frequency of execution of each service routine includes collecting and recording statistics on the frequency of execution of each service routine; and updating the grouping of each of the service routines in each of the plurality of functions during execution of the service routine.

9. The computer implemented method of claim 8, further comprising computer-executable instructions for performing the steps of:

grouping a first plurality of the service routines to generate a first function;

grouping a second plurality of the service routines to generate a second function different than the first function with the frequency of execution of the second plurality of service routines being less than a predetermined frequency value; and assigning a service routine code to a first frequently used service routine grouped into the first function, the service routine code being shorter relative to any other service routine assigned any one of the second plurality of service routines grouped in the second function so that the first frequently used service routine executes faster than each one of the second plurality of service routines grouped in the second function.

10. The computer implemented method of claim 9, further comprising computer-executable instructions for performing the further steps of:

branching jumps from each service routine of the first plurality of the service routines grouped in the first function to every other service routine grouped in the first function;

branching jumps from each service routine of the second plurality of the service routines grouped in the second function to every other service routine grouped in the second function; and branching jumps from each of the plurality of functions to at least one of the other functions.

11. The computer implemented method of claim 8, the steps further comprising:

assigning a plurality of service routine codes with each service routine code assigned to one of the plurality of functions and being different than every other service routine code, and thereafter arranging the service routine codes in a sequential block.

12. The computer implemented method of claim 8, wherein the computer executable instructions are written in a high-level programming language.

13. The computer implemented method of claim 8, further comprising computer-executable instructions for performing the step of:

using a prediction table to reduce a number of branching jumps.

14. A computer including a simulator operable to execute a set of simulator instructions simulated by a plurality of service routines, the computer configured to execute a series of computer-executable instructions stored on a computer readable medium, comprising:

a first set of computer-executable instructions that monitor frequency of execution of each one of the plurality of service routines;

a second set of computer-executable instructions that assigns each one of the plurality of service routines into one of a plurality of function groups based on the frequency of execution of each service routine; and a third set of computer-executable instructions configured to reassign at least one service routine from one of the plurality of function groups into a different one of the plurality of function groups based on its frequency of execution subsequent its previous function group assignment.

15. The computer of claim 14, further comprising:

a fourth set of computer-executable instructions that assign a first plurality of service routines into one of the plurality of function groups, and a fifth set of computer-executable instructions for assigning a second plurality of service routines into a different one of the plurality of function groups where the frequency of use of the second plurality of service routines is less than a predetermined frequency threshold, and a sixth set of computer-executable instructions for assigning a service routine code to each one of the frequently used service routines in the one function group that is shorter than any service routine code assigned to any one of the second plurality of service routines in the different function group such that each one of the more frequently used service routines in the one function group executes faster than any one of the plurality of service routines in the different function group.

16. The computer of claim 15, further comprising:

a seventh set of computer-executable instructions for branching jumps from each service routine of the first plurality of the service routines grouped into the one function group to every other service routine that is also grouped into the one function group;

an eighth set of computer-executable instructions for branching jumps from each service routine of the second plurality of the service routines grouped into the different function group to every other service routine that is also grouped into the different function group; and a ninth set of computer-executable instructions for branching jumps from each one of the plurality of function groups to at least one other of the plurality of function groups.

\* \* \* \* \*